UNITED STATES PATENT OFFICE.

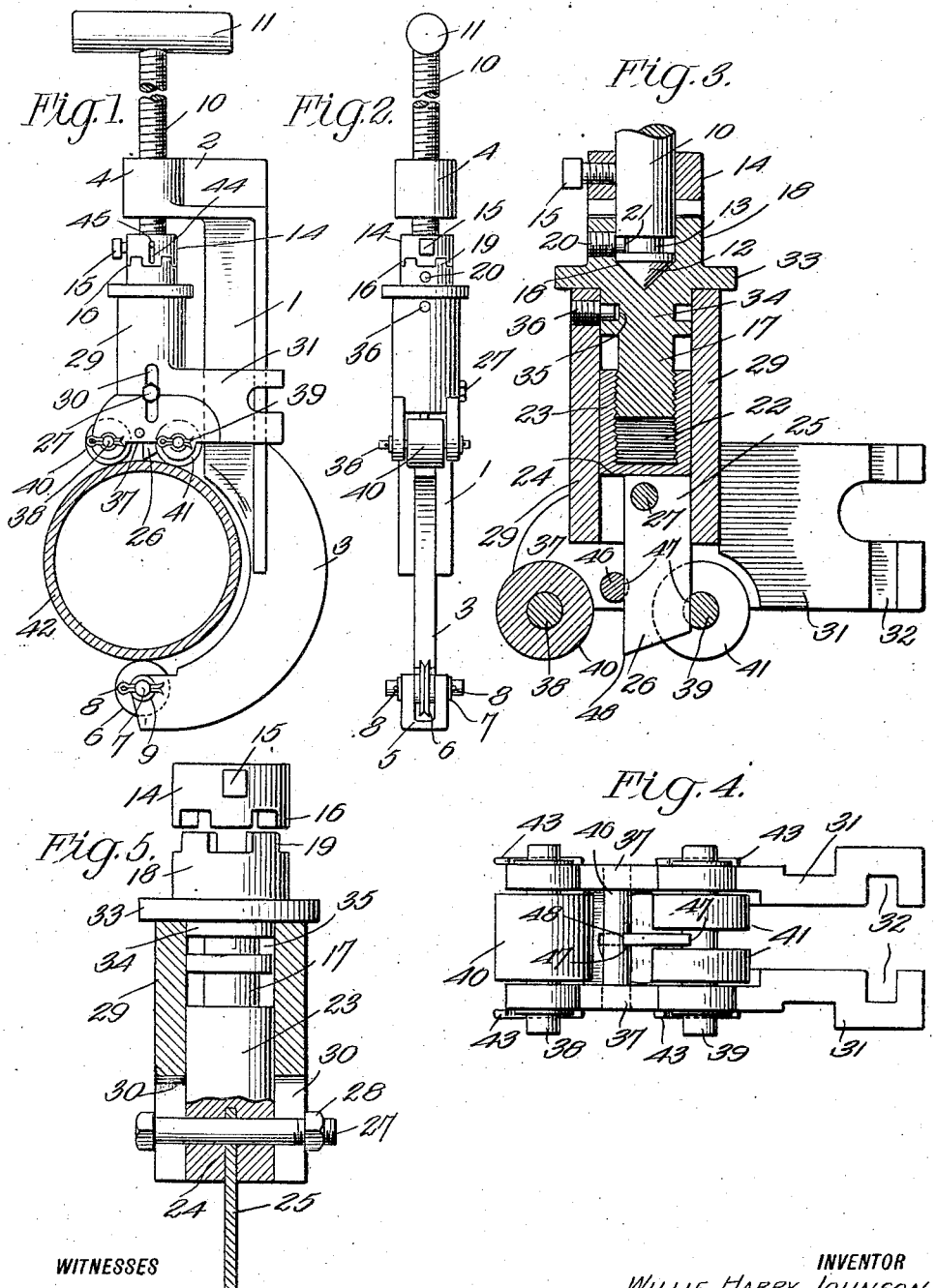

WILLIE HARRY JOHNSON, OF WACO, TEXAS.

PIPE-CUTTER.

1,064,655.  Specification of Letters Patent.  Patented June 10, 1913.

Application filed March 12, 1912. Serial No. 683,321.

*To all whom it may concern:*

Be it known that I, WILLIE HARRY JOHNSON, a citizen of the United States, residing at Waco, in the county of McLennan and State of Texas, have invented a new and useful Improvement in Pipe-Cutters, of which the following is a specification.

My invention is an improvement in pipe cutters, and has for its object, the provision of a simple, easily operated device of the character specified, by means of which a portion of the material of the pipe is removed to form the cut, instead of the material being displaced and wedged apart without removing.

In the drawings, Figure 1 is a side view of the improvement with the pipe in section. Fig. 2 is a front view. Fig. 3 is an enlarged vertical section of the cutting mechanism. Fig. 4 is a bottom plan view of the cutting mechanism, and Fig. 5 is an enlarged sectional view of the holder.

The present embodiment of the invention comprises a frame, or support, composed of a standard 1 of general T-shape, provided with a lateral arm 2 at its top, and the support has an arc shaped extension 3 at its lower end. The arm 2 has a threaded bearing 4 at its outer end, and the end of the extension 3 is forked at its lower end, as shown at 5 and a disk cutter 6 having a double cutting edge is journaled between the arms of the fork, on a pin 7.

A cotter pin 8 is passed through each end of the pin 7, for preventing longitudinal movement thereof. The cotter pins also prevent rotation of the pin. A stem 10 is threaded through the bearing, the stem having a cross head 11 at its upper end, forming a handle for turning the said stem. The lower end 12 of the stem is conical, and the stem is provided with an annular groove 13 above the conical portion. A collar 14 is held on the rod, above the groove 13, by means of a set screw 15, and the lower end of the collar is notched or recessed at 16.

A connecting member 18 is seated in the upper end of a sleeve 29 to be described, and the said member has a threaded stem 17 which engages the recess 22, in the upper end of the holder 23 to be described. The said connecting member has a socket in its upper end in which is received the lower end of the rod 10, and the upper end of the said member 18 is notched or recessed at 19 to correspond with and fit the notches 16. A screw 20 is threaded through the socket wall and is provided with a reduced end 21 for engaging the groove 13. The holder 23 is of approximately cylindrical form, having its lower end transversely slotted at 24, to receive the shank 25 of a cutting blade 26.

A bolt 27 is passed transversely of the holder at the slot, and through an opening in the shank to hold the cutter in place, and a nut 28 engages the bolt, to hold the parts together. The holder 23 is slidable in a sleeve 29, and the sleeve is provided with oppositely arranged longitudinal slots 30, for the ends of bolt 27. The sleeve 29 is provided with a pair of lateral arms 31, at its lower end, engaging opposite sides of standard 1, and each arm has its outer end grooved or channeled vertically at 32, to fit the said standard. The stem 17 has an annular flange or rib 33 extending outward and engaging the upper end of sleeve 29, and below the flange the stem is reduced at 34 to fit within the sleeve. The reduced portion 34 is provided with an annular groove 35, for receiving the inner end of a screw 36, which is threaded through the sleeve. The lower end of sleeve 29 is also provided with oppositely arranged bearing plates 37 for holding journal pins 38 and 39. A roller or wheel 40 is journaled on pin 38, between plates 37, and a pair of wheels or rollers 41 is journaled on pin 39.

The rollers 41 are on opposite sides of the cutter 26, and the roller 40 is in front of the same. The pipe 42 to be cut is engaged by the said rollers, the wheel 6 and the cutter 26. The pins 38 and 39 are held in place, and also held from rotation, by cotter pins 43. It will be noted from an inspection of Figs. 1, 2 and 4, that the bearings in the arms of the fork for the pins 7, and the bearings for the pins 38 and 39 are grooved transversely on their outer faces to receive the cotter pins 8 and 43 in order to prevent rotation of the pins.

The blade 25—26 is adjustable vertically, and is held from forward or rearward movement, by means of the pin 39, and a pin 46 arranged transversely of the bearing plates 37, between the pins 38 and 39. Each pin 39 and 46 is provided with a transverse groove or notch 47, for receiving the edge of the blade, as shown in Figs. 3 and 4. It will be noted from an inspection of Figs. 1 and 3, that the point 48 of the cutting blade engages the pipe, at a point half-way between the axes of the rollers 40 and 41, and at a point diametrically opposite the engagement of the disk cutter 6. The front edge of the blade is perpendicular to a tangent engaging the pipe at the point of contact of the said point 48.

In operation, the device is arranged as shown in Fig. 1, and the cutter blade 25—26 is adjusted to the proper position. The collar 14 and a connecting member 18 may be clutched together by the notches of these parts, or released, by releasing set screw 15, and moving the collar upward. The collar is slotted at 44, and the slots are engaged by pins 45 on the rod, as shown in Fig. 1, to permit the collar to be moved away from the connecting member. When the collar is unclutched from the connecting member, the connecting member may be turned to move the holder 23, to adjust the cutter blade into engagement with the pipe. The collar is now clutched to the connecting member and held by set screw 15. When so adjusted, the device as a whole is rotated on the pipe, while the pipe is held in a vise or the like. As the device is turned on the pipe in the direction of the arrow, the disk cutter 6 makes a double incision around the pipe in advance of cutter 25—26, and the lower corner of the cutter blade removes a thread of metal between the incisions. The rod 10 is turned at each rotation of the device to tighten the cutters on the pipe, until the pipe is severed. When the pipe is cut, the device is removed, and if the new pipe is of the same size as the old, no new adjustment is required. The thread of the stem 17 is a left hand thread, that is in the opposite direction to the thread of rod 10, but the pitch of the threading is the same on both. The slots 30 are of less length than the length of the threaded portion of stem 17, so that the stem cannot become disengaged from the recess of the holder. When rod 10 is turned to force the pipe toward cutter wheel 6 cutter 25—26 is forced toward the pipe also, on account of the above manner of threading. The bolt 27 is provided with a shoulder at the inner end of the thread, against which the nut 28 jams when tightened, so that the bolt cannot be tightened on the sleeve 29, but is always free to move in the slot 30. The rod 10 is provided with indentations for engagement by the screw 15, to prevent slipping of the screw on the rod.

I claim:

1. A pipe cutter comprising a standard having at one end a lateral arm provided with a threaded bearing, and at the other with an arc shaped extension for partially encircling the pipe, a disk cutter having a double cutting edge journaled at the end of the extension, a sleeve movable on the standard toward and from the disk cutter, rollers on the sleeve for engaging the pipe, a holder slidable in the sleeve and provided with a recess in its upper end internally threaded in the opposite direction to the bearing, and at the same pitch, a connecting member seated in the upper end of the sleeve and provided with a threaded stem engaging the recess, means for limiting the movement of the holder in the sleeve, a cutting blade secured in the holder, a rod threaded into the bearing of the lateral arm, a rotatable connection between a connecting member and the rod, and releasable means for clutching a connecting member to the rod.

2. A pipe cutter comprising a standard having at one end a lateral arm provided with a threaded bearing, and at the other with an arc shaped extension for partially encircling the pipe, a disk cutter having a double cutting edge journaled at the end of the extension, a sleeve movable on the standard toward and from the disk cutter, rollers on the sleeve for engaging the pipe, a holder slidable in the sleeve and provided with a recess in its upper end internally threaded in the opposite direction to the bearing, and at the same pitch, a connecting member seated in the upper end of the sleeve and provided with a threaded stem engaging the recess, means for limiting the movement of the holder in the sleeve, a cutting blade secured in the holder, a rod threaded into the bearing of the lateral arm, and a rotatable connection between a connecting member and the rod.

3. A pipe cutter comprising a support having an arc shaped extension for partially encircling the pipe to be cut, a disk cutter provided with a double cutting edge journaled at the outer end of the extension, a sleeve mounted to slide on the support toward and from the cutter, rollers on the sleeve for engaging the pipe, a holder in the sleeve, a cutter blade connected to the holder and arranged between the rollers and cutting between the incisions of the disk cutter, said holder having an internally threaded recess in its upper end, a connecting member having a threaded stem engaging the recess, a rod rotatably connected to a connecting member, said support having a bearing threaded in the opposite direction to the recess for engagement by the rod, and means for rigidly connecting the rod to a connecting member to constrain a connecting member to rotate with the rod.

4. A pipe cutter comprising a support having an arc shaped extension for partially encircling the pipe to be cut, a disk cutter provided with a double cutting edge journaled at the outer end of the extension, a sleeve mounted to slide on the support toward and from the cutter, rollers on the sleeve for engaging the pipe, a holder in the sleeve, a cutter blade connected to the holder and arranged between the rollers and cutting between the incisions of the disk cutter, said holder having an internally threaded recess in its upper end, a connecting member having a threaded stem engaging the recess, a rod rotatably connected to a connecting member, the support having a threaded bearing for engagement by the rod, and means for securing the rod to a connecting member.

5. A pipe cutter comprising a support having an arc shaped extension for partially encircling the pipe to be cut; a disk cutter provided with a double cutting edge journaled at the outer end of the extension, a sleeve mounted to slide on the support toward and from the cutter, rollers on the sleeve for engaging the pipe, a holder in the sleeve, a cutter blade connected to the holder and arranged between the rollers and cutting between the incisions of the disk cutter, means for simultaneously feeding the disk cutter and the holder toward the pipe, said means being rotatable with respect to the holder, and means for connecting the holder to the feeding means to cause the holder to rotate with the feeding means.

6. A pipe cutter comprising a support having an arc shaped extension for partially encircling the pipe to be cut, a disk cutter provided with a double cutting edge journaled at the outer end of the extension, a sleeve mounted to slide on the support toward and from the cutter, rollers on the sleeve for engaging the pipe, a holder in the sleeve, a cutter blade connected to the holder and arranged between the rollers and cutting between the incisions of the disk cutter, and means for simultaneously feeding the disk cutter and the holder toward the pipe.

7. A pipe cutter comprising a support having an arc shaped extension for partially encircling the pipe to be cut, a disk cutter provided with a double cutting edge journaled at the outer end of the extension, a sleeve mounted to slide on the support toward and from the cutter, a holder in the sleeve, a cutter blade connected to the holder and arranged to cut between the incisions of the disk cutter, and means for simultaneously feeding the disk cutter and the holder toward the pipe.

8. A pipe cutter comprising a support having an arc shaped extension for partially encircling the pipe to be cut, a disk cutter provided with a double cutting edge journaled at the outer end of the extension, a holder for a blade slidably mounted on the support, a cutter blade connected to the holder and cutting between the incisions of the disk cutter, and means for simutaneously feeding the disk cutter and the holder.

9. A pipe cutter comprising a support adapted to partially encircle the pipe to be cut, a disk cutter having a double cutting edge journaled on one end of the support, a blade holder mounted to slide on the support toward and from the disk cutter, a blade connected to the holder and arranged to cut between the cuts of the disk cutter, and means for simultaneously feeding the disk cutter and the holder toward the pipe.

10. A pipe cutter comprising a support adapted to partially encircle the pipe to be cut, a disk cutter having a double cutting edge journaled on one end of the support, a cutter blade slidably connected to the support for movement toward and from the disk cutter, said blade being arranged to cut between the cuts of the disk cutter, means for simultaneously feeding the blade and the disk cutter, said means being detachable from the blade to permit the adjustment of the blade, and means for connecting the blade to the feeding means to cause the holder to rotate with the feeding means.

11. A pipe cutter comprising a support adapted to partially encircle the pipe to be cut, a disk cutter having a double cutting edge journaled on one end of the support, a cutter blade slidably connected to the support for movement toward and from the disk cutter, said blade being arranged to cut between the cuts of the disk cutter, and means for simultaneously feeding the blade and the disk cutter.

12. A pipe cutter comprising a support adapted to partially encircle the pipe to be cut, a disk cutter having a double cutting edge journaled on one end of the support, a cutter blade slidably connected to the support for movement toward and from the disk cutter, said blade being arranged to cut between the cuts of the disk cutter and to engage the pipe at a point diametrically opposite the engagement of the disk cutter, and means for simultaneously feeding the blade and the disk cutter.

13. A pipe cutter comprising a support adapted to partially encircle the pipe to be cut, a disk cutter having a double cutting edge journaled on one end of the support, a cutter blade slidably connected to the support for movement toward and from the disk cutter, said blade being arranged to cut between the cuts of the disk cutter, and at a point diametrically opposite the engagement of the disk cutter, means for simultaneously feeding the blade and the disk cutter, a pin arranged parallel to the axis of the disk cutter on each side of the blade, a roller journaled on the pin in front of the blade for engaging the pipe, a pair of rollers journaled on the pin behind the blade, one of said rollers being on each side of the blade and adapted to engage the pipe, said blade having its lower end beveled to form a cutting point at the front edge of the blade, said point being at equal distances from the axes of the pins, and means for guiding the blade in its movement, said means comprising a groove in the pin behind the cutter for receiving the edge of the blade, a pin arranged transversely of the support in front of the blade and having a notch for receiving the front edge thereof.

14. A pipe cutter comprising a support adapted to partially encircle the pipe to be cut, a disk cutter having a double cutting edge journaled on one end of the support, a cutter blade slidably connected to the support for movement toward and from the disk cutter, said blade being arranged to cut between the cuts of the disk cutter, and at a point diametrically opposite the engagement of the disk cutter, means for simultaneously feeding the blade and the disk cutter, a pin parallel to the axis of the disk cutter on each side of the blade, a roller journaled on the pin in front of the blade for engaging the pipe, a pair of rollers journaled on the pin behind the blade, one of said rollers being on each side of the blade and adapted to engage the pipe, said blade having its lower end beveled to form a cutting point at the front edge of the blade, said point being at equal distances from the axes of the pins.

15. A pipe cutter comprising a support for engaging the pipe to be cut, a disk cutter having a double cutting edge journaled on the support for engaging the pipe, a cutter blade slidable on the support toward and from the disk cutter and arranged to engage the opposite side of the pipe from the disk cutter and to cut between the cuts of the disk cutter, means for simultaneously feeding the blade on the disk cutter, said blade being adjustable with respect to the feeding means, a pin on the support on each side of the blade, each pin having a transverse groove for receiving the edge of the blade.

16. In a pipe cutter a support for engaging the pipe, a blade on the support, means for feeding the blade toward and from the pipe, means for adjusting the blade with respect to the feeding means, and means for guiding the blade, said means comprising a pin on each side thereof, each pin having a transverse groove for receiving the edge of the blade.

17. In a pipe cutter, a support, a disk having a double cutting edge journaled on the support at one end thereof, a cutting blade on the support, said blade being arranged to engage between the cuts of the disk, and means for feeding the blade toward the disk.

WILLIE HARRY JOHNSON.

Witnesses:
G. L. WILEY,
O. L. SIMS.